United States Patent
Wood

[19]

[11] Patent Number: 5,814,136
[45] Date of Patent: Sep. 29, 1998

[54] DESICCANT CONTAINER

[75] Inventor: Raymond B. Wood, Brookville, Ohio

[73] Assignee: Stanhope Products Company, Brookville, Ohio

[21] Appl. No.: 837,985

[22] Filed: Apr. 15, 1997

[51] Int. Cl.$^6$ .............................................. B01D 53/04
[52] U.S. Cl. ............................... 96/147; 55/515; 62/503; 210/282; 210/DIG. 6
[58] Field of Search .......................... 96/147; 55/512, 55/516, 515, 517, 518, 519; 210/DIG. 6, 282; 62/503, 474, 475, 471

[56] References Cited

U.S. PATENT DOCUMENTS

| | | | |
|---|---|---|---|
| 3,545,227 | 12/1970 | Grahl | 62/474 |
| 3,799,352 | 3/1974 | McClive | 210/282 |
| 3,879,292 | 4/1975 | McClive | 210/282 |
| 4,072,615 | 2/1978 | McConnell | 96/147 |
| 4,116,649 | 9/1978 | Cullen et al. | 55/387 |
| 4,291,548 | 9/1981 | Livesay | 62/503 |
| 4,401,447 | 8/1983 | Huber | 55/387 |
| 4,405,347 | 9/1983 | Cullen et al. | 55/387 |
| 4,436,623 | 3/1984 | Cullen et al. | 210/282 |
| 4,457,843 | 7/1984 | Cullen et al. | 210/282 |
| 4,464,261 | 8/1984 | Cullen et al. | 210/282 |
| 4,474,035 | 10/1984 | Amin et al. | 62/503 |
| 4,496,378 | 1/1985 | Kish | 55/316 |
| 4,509,340 | 4/1985 | Mullally et al. | 62/503 |
| 4,619,673 | 10/1986 | Cullen et al. | 55/387 |
| 4,866,951 | 9/1989 | Masterson II | 62/503 |
| 4,911,739 | 3/1990 | Cullen et al. | 55/387 |
| 4,994,185 | 2/1991 | Cullen et al. | 210/282 |
| 5,022,902 | 6/1991 | Juhl et al. | 55/515 |
| 5,036,972 | 8/1991 | Cullen et al. | 206/204 |
| 5,038,582 | 8/1991 | Takamatsu | 62/474 |
| 5,177,982 | 1/1993 | Plemens | 62/503 |
| 5,184,480 | 2/1993 | Kolpacke | 62/503 |
| 5,289,697 | 3/1994 | Hutchinson | 62/474 |
| 5,435,153 | 7/1995 | Hutchison et al. | 62/474 |
| 5,529,203 | 6/1996 | Flaugher | 220/306 |
| 5,540,348 | 7/1996 | Wood | 62/474 |
| 5,569,316 | 10/1996 | Flaugher et al. | 55/519 |
| 5,570,589 | 11/1996 | Petty | 62/503 |
| 5,580,451 | 12/1996 | Tack | 62/474 |
| 5,596,882 | 1/1997 | Hutchinson et al. | 62/503 |
| 5,636,525 | 6/1997 | Riemenschneider | 96/147 |
| 5,651,266 | 7/1997 | Hutchinson et al. | 62/503 |

Primary Examiner—Duane S. Smith
Attorney, Agent, or Firm—Biebel & French

[57] ABSTRACT

A cup like, rigid desiccant container and methods for co-molding the container to associated accumulator tubing are disclosed. The container includes an elongated U-shaped slot bounded by upstanding wall surfaces of the housing. A first pair of opposed ridges formed on opposite ones of the walls is provided for snap fitting over an accumulator tube or tube segment. A pair of opposing protuberances is provided on opposite wall surfaces near the circumferential border of the container to provide a second grasping location to snap or friction fit over a second tube or tube segment.

13 Claims, 5 Drawing Sheets

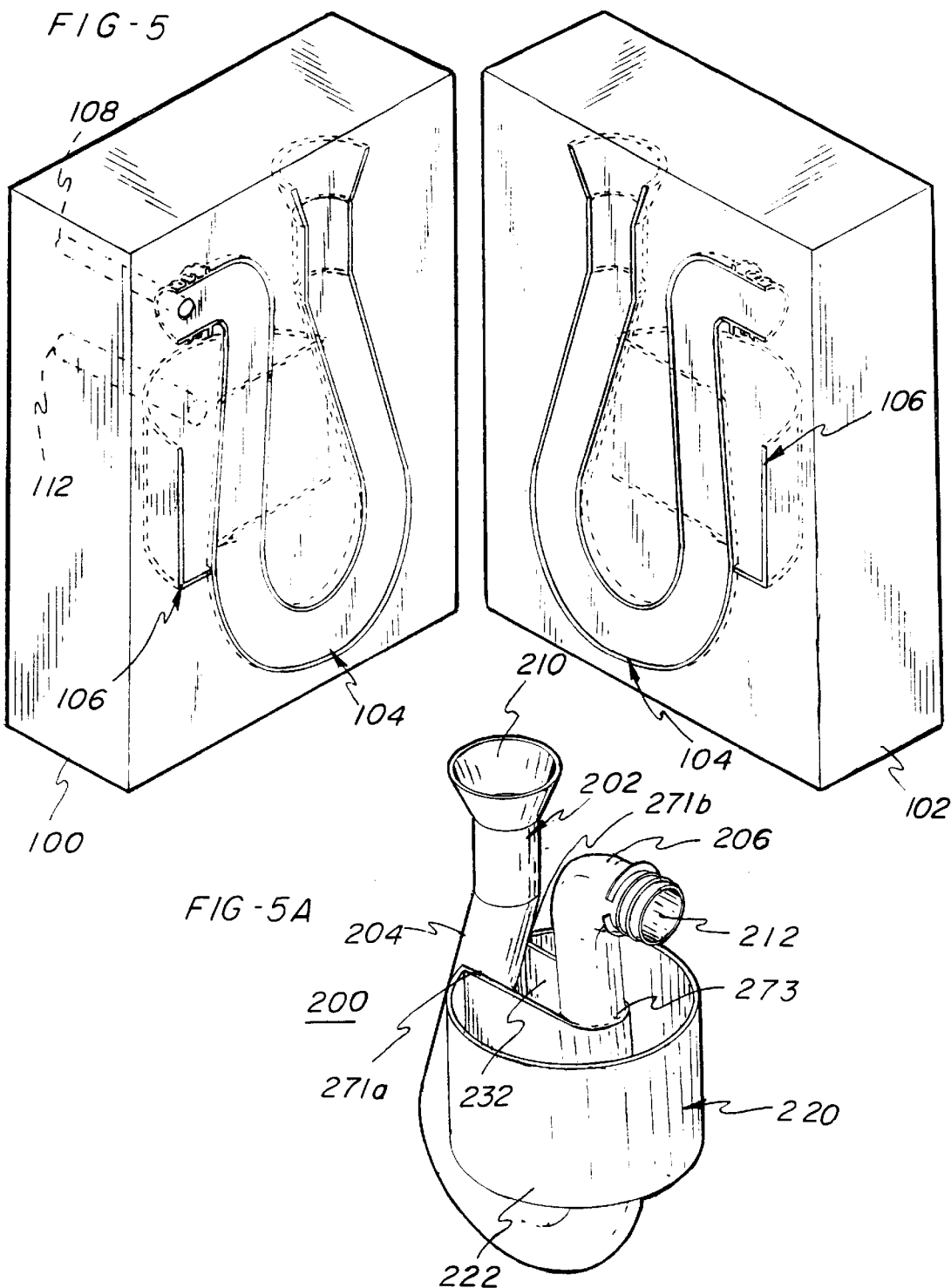

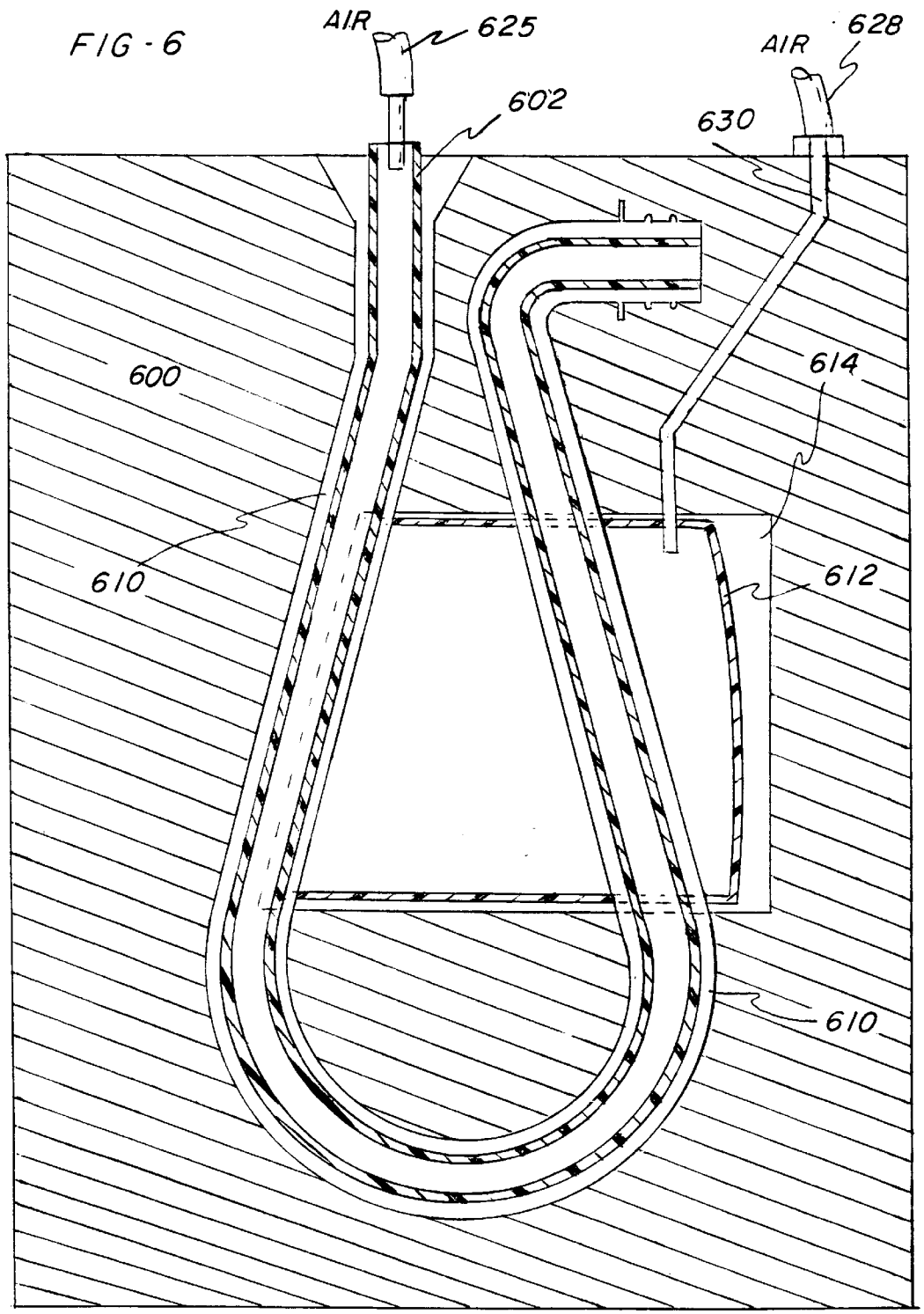

DESICCANT CONTAINER

FIELD OF THE INVENTION

The present invention pertains to a snap or clip on type desiccant container that is adapted for use in an accumulator or receiver dryer of an automotive air conditioning system.

BACKGROUND OF THE INVENTION

Desiccants are commonly used in automotive air conditioning systems for dehydrating air and refrigerants. Particulate desiccants are often employed in these systems because of their high surface area to volume ratios which enhance interaction of the desiccant particles with surrounding air or fluid. Since the desiccant particles must be held in an air or fluid stream and prevented from contaminating other parts of the system, the particles must be held in a container which is permeable to the air or fluid but impermeable to the particles.

One type of desiccant container is a fabric pouch type that is constructed of a synthetic wool-like felt or polyester. In these types of desiccant containers, the pouch-like fabric may be stitched, or ultrasonically sealed into the desired configuration. One drawback to these fabric pouches is that they may not closely conform to the inside shape of the accumulator or receiver dryer in which it is used. Additionally, fabric pouches are sometimes subject to burn through when the accumulator or receiver dryer is welded shut during manufacture.

Rigid canister or cup-like desiccant containers are also known in the art. These may be composed of plastic or metal. Although these usually provide a uniform cross-sectional dimension to closely conform with the interior housing of the accumulator or receiver dryer, secure mounting of these to the associated tubing has sometimes been challenging. For example, exact dimensioning of the diameter of the cup must be made if it is to nest snugly in the housing interior. Additionally, flanges or a shoulder-like stop may be formed on the associated accumulator/receiver dryer tubing to mount the desiccant cup in the housing. As used throughout the specification and claims, the terms accumulator and receiver dryer shall be synonymous and shall mean a housing member in which refrigerant or other fluid flow is passed through a desiccant containing structure for subsequent passage to other system components of an air conditioning or refrigeration system.

Typically, the accumulator or receiver dryer has a permanently sealed casing which includes a baffle to separate the liquid from the gas component. In many of such systems a generally U-shaped suction or pick up tube is positioned in the housing and commonly has a bight portion which has a bleed or aspiration opening disposed toward the container bottom. This tube also may have two legs which extend upwardly toward the baffle at the top of the housing in parallel or angular inclination with each other. One end of the pick up or suction tube is adapted to receive an inflow of vaporized refrigerant for delivery to the suction side of the compressor by downward flow past the aspiration opening. Accumulators of this general type are disclosed in U.S. Pat. No. 4,291,548 (Livesay) and U.S. Pat. No. 4,496,378 (Kisch).

In these types of accumulators, a desiccant containing fabric pouch like package may be strapped or otherwise wrapped about the pick up or suction tubes to filter and dry refrigerant fluid, containing lubricating oil, upstream from passage into the aspirator opening on the bight tube for subsequent flow to the suction side of the compressor. In some of these systems, the desiccant containing package slips during usage or is positioned too close to the bottom or reservoir of the housing. This undesirable positioning leads to contamination of porous felt or fabric desiccant container fluid flow port liners by lubricating oil or other fluids dictating that additional quantities of felt or fabric must be used in the manufacturing process in order to meet desired performance specifications.

Accordingly, there is a need for a stable solid desiccant container that is of uniform size and shape that is quickly but securely mounted over the requisite accumulator tubing above the reservoir.

An even more specific need exists for an integral accumulator tubing/desiccant container structure that may in its entirety, be quickly inserted and positioned within the accumulator housing without the need to separately position and mount the desiccant container over existing equipment tubing.

SUMMARY OF THE INVENTION

These and other objects are met by the provision of a generally cylindrical desiccant container that houses desiccant therein. The container is of a stable, solid construction, preferably plastic. Fluid pervious ingress and egress ports may be provided in the container, for example, along the top and bottom transverse container areas to allow refrigerant or other fluid to flow into and through the ontainer in contact with the desiccant retained therein.

The container includes a generally U-shaped slot formed therein adapted for snap fit over one of the accumulator tubes to provide a fixed, secure mount of the container in the accumulator housing above the sump or liquid reservoir. The slot, when viewed in plan, is of a substantially U-shape with opposed upstanding walls of the container defining the slot being provided with longitudinally extending ridges that serve as a snap or friction fit location for the accumulator tube.

In a preferred embodiment, the U-shaped slot comprises a generally cylindrical portion disposed proximate the central axis of the container. The longitudinally extending ridges are positioned on the opposed upstanding container walls at a position closely adjacent the cylindrical portion. Distal ends of the opposed walls are located at the circumferential end of the slot and are provided with opposed, matching protuberances to serve as a friction fit location for another tubular segment of the accumulator tubing.

In another aspect of the invention, the desiccant container and accumulator tubing are co-molded in a common molding process to provide a unitary structure for easy insertion into the desired accumulator housing.

The invention will be further described in conjunction with the appended drawings and following detailed description.

BRIEF DESCRIPTION OF THE DRAWINGS

FIG. 5 is an exploded perspective view of a mold that can be used to make a unitary accumulator tube/desiccant container in accordance with the invention;

FIG. 5a is an orthogonal view of the unitary accumulator tube/desiccant container made in accordance with the invention; and FIG. 6 is a transverse cross-sectional view of a mold that may be used to blow mold the unitary accumulator tube/desiccant container in accordance with the invention.

DETAILED DESCRIPTION OF THE PREFERRED EMBODIMENT

Figure 1:
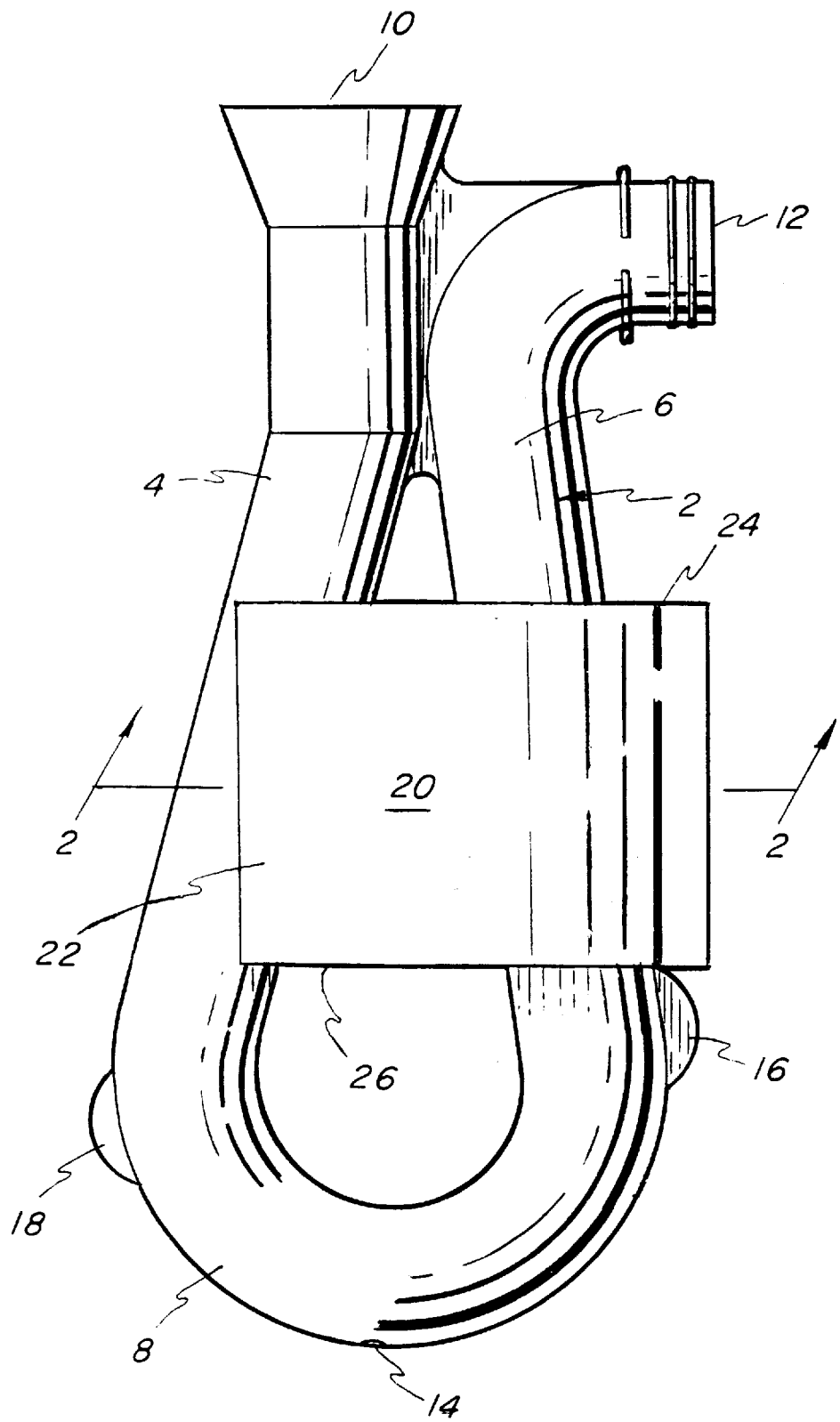
FIG. 1 is a side elevational view showing an accumulator suction tube and desiccant container, in accordance with the invention, mounted thereon.

Turning first to FIG. 1 there is shown accumulator tube 2 of the type well known in the art that is adapted to provide for fluid flow from an air conditioning system evaporator to the suction side of a condenser in accumulators of the type specified in U.S. Pat. No. 4,474,035 (Amin et al.) and U.S. Pat. No. 4,496,378 (Kish), the entire disclosures of which are incorporated by reference herein.

The accumulator tube comprises upstanding leg members 4 and 6 shown here as angularly inclined toward each other, and connected by bight tube portion 8. The bight portion is adapted for receipt in the accumulator housing adjacent the reservoir or bottom end thereof. Mouth 10 is provided in leg 4 to serve as an entry port for fluid flow through the accumulator tube 2 with exit 12 provided and adapted for connection to the suction side of an air conditioner compressor or the like.

Aperture 14 is provided on the underside of bight portion 8 to serve as an aspirator opening through which the dehydrated fluid will flow through tube 2 and out exit 12. Lug members 16, 18 are provided integral with the legs 4, 6, to help space the tubing in the accumulator canister.

Desiccant container 20, preferably composed of a thermoplastic material such as polyolefinic polymer is of generally cylindrical shape having outer peripheral wall 22, with top walls 24, 26 thereby defining, in the interior, a housing for desiccant that may, for example, be in the form of beads, flakes, powders or cake.

Figure 4:
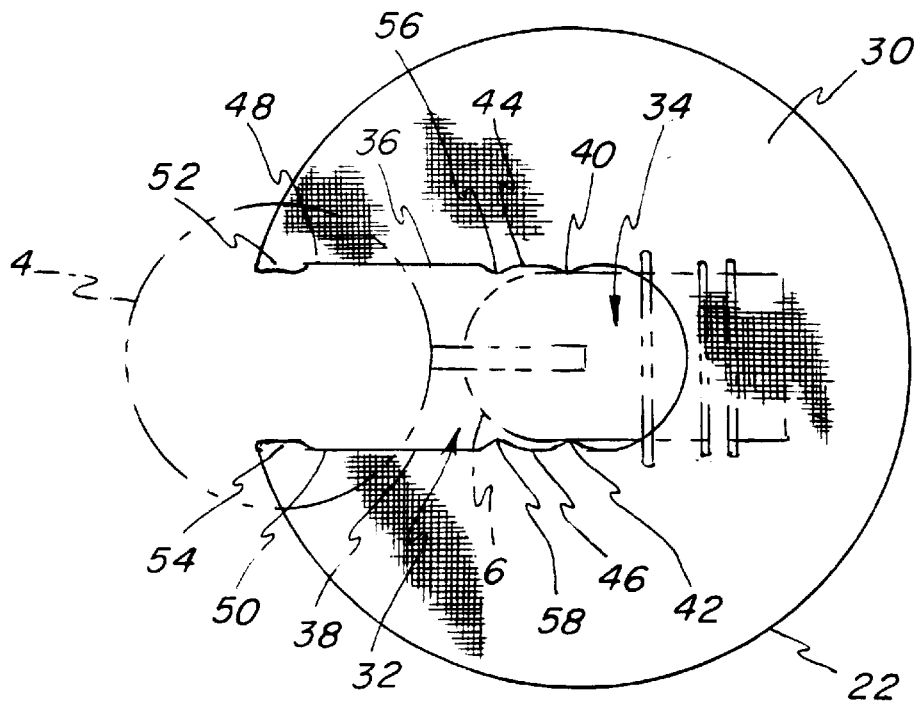
FIG. 4 is a top plan view of the assembly shown in FIG. 1, with the accumulator tubing being shown therein in phantom for increased clarity.

Turning now to FIG. 4, there is shown a top plan view of the assembly. Here, fluid pervious felt 30 is provided on the top side of the generally cylindrical desiccant container 20. The felt may be secured over the top wall 24 via heat or ultrasonic welding or other similar means including adhesives. The top wall of the container is provided with a generally U-shaped slot 32 with a cylindrical slot portion 34 being formed proximate the center of the cylinder and preferably being generally co-axial therewith. The slot 32 comprises walls 36, 38. Opposed ridges 40, 42 are formed in the respective walls 36, 38, and are positioned closely adjacent the cylindrical portion 34 of the slot. The transverse dimension between the ridges 40, 42, is adapted for friction or snug fit of the tube 6 therein. Preferably, the widthwise or transverse dimension between the ridges 40, 42 is on the order from about 0.80–0.99:1 based on the diameter dimension of the cylindrical portion 34 of slot 32.

The wall 36 includes a proximal end 44 adjacent the cylindrical portion with the wall 38 provided with a proximal end 46 adjacent the cylindrical portion. Distal end 48 of the wall 36 is provided and opposed by distal end 50 of wall 38. The distal ends 48, 50 are disposed at circumferential ends of the cylindrical container. Each distal end 48, 50 includes a protuberance 52, or 54 which are opposed to each other and which define therebetween a second transverse dimension that is adapted to snap fit over upstanding left leg 4 of the accumulator tube 2 structure.

Additionally, stabilizer ridges 56, 58, are formed in respective walls 36, 38, intermediate the ridges 40, 42 and protuberances 52, 54. The ridges 56, 58, help to stabilize the container against lateral shifting movement relative to tube 6.

Figure 3:
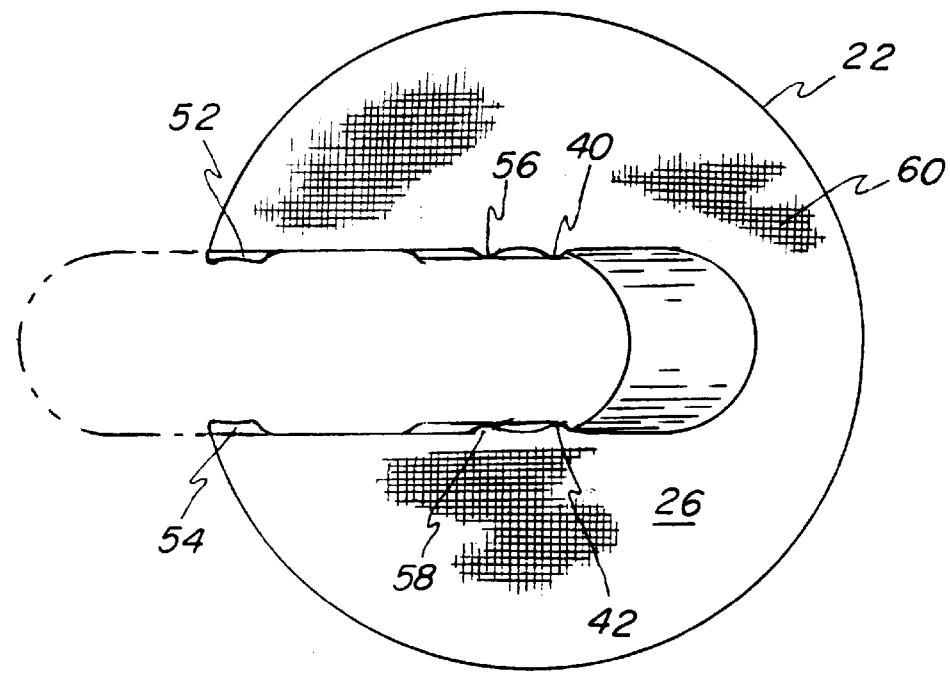
FIG. 3 is a bottom plan view of the assembly shown in FIG. 1.

Turning now to FIG. 3, there is shown the bottom end 26 of the desiccant container. This end also is provided with a fluid pervious felt material 60. Again, this felt is suitably adhered over the bottom walls of the container via conventional sealing techniques. It is apparent that the felt 30 (FIG. 4) and felt 60 (FIG. 3) are fluid pervious but retain the desired desiccant material within the container. The top and bottom wall of the container thereby serve to provide ingress and egress of fluid flow through the container so that the dehydrating beads or the like may provide the intended dehydration function to the fluid passing through the container.

Figure 2:
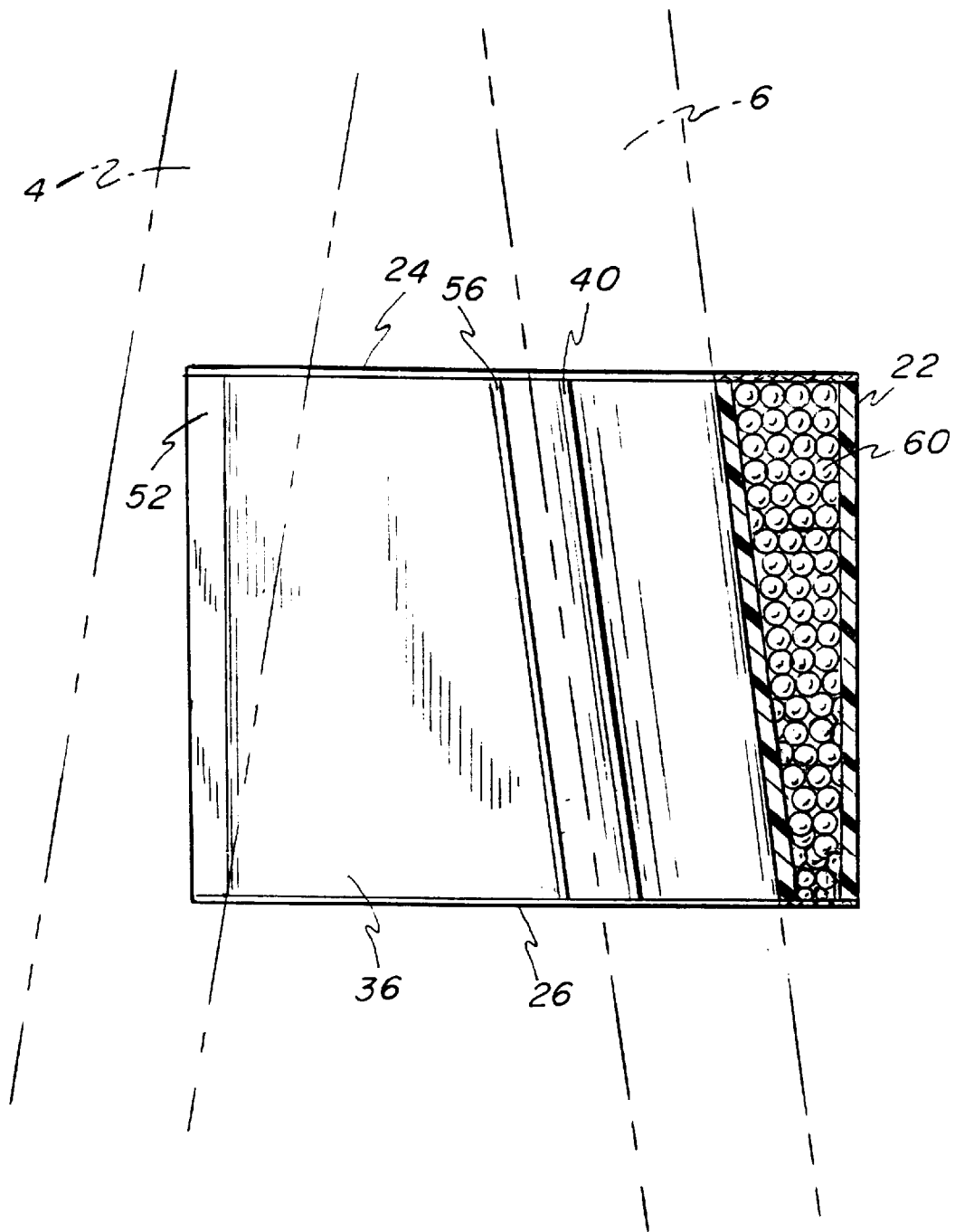
FIG. 2 is a transverse partially cut away cross-sectional view taken along the lines and arrows 2—2 of FIG. 1, with portions of the accumulator tubes shown in phantom for increased clarity.

Turning now to FIG. 2, wall 36 is shown with ridge 40 and stabilizer ridge 56 formed thereon in parallel relation. Preferably, both of these ridges are inclined at an angle of about 10° to 20° relative to the longitudinal axis of the cylindrical container.

Also, FIG. 2 illustrates the lengthwise extending protuberance 52 positioned along the distal portion of wall 36 at the circumference of the cylindrical container. As shown, this protuberance 52 engages left leg 4 of the accumulator tube 2. Also, as shown, desiccant beads 60 are provided in the housing although as previously mentioned, other forms of desiccants may be used.

It is apparent from review of FIGS. 1–4 that the ridge members 40, 42 are disposed on opposed walls of the slot and in parallel relation to each other. Moreover, these ridge members are disposed at an acute angle relative to the longitudinal axis of the cylindrical housing and are preferably disposed at an angle of about 10°–20° thereto. In one particularly preferred embodiment of the invention, the preferred angle of inclination for the ridges 40, 42 is about 14°. Together, the ridges 40, 42 serve to securely grasp a first tube or tube segment in the accumulator housing.

Also, to provide an effective but easily accomplished snap-fit the transverse dimension existing between the ridges 40, 42 is preferably chosen so that it is smaller than the diameter of cylindrical portion 34 of the slot. Here to, it has been found that a ratio of this transverse dimension to the diameter 34 of slot 32 of about 0.80–0.99:1 is preferred with the most preferred ratio being about 0.90:1.

The protuberances 52, 54 stand in opposition to each other depending from the walls 36, 38 respectively. The transverse dimension between the protuberances 52, 54 is such that they will frictionally engage or snap fit over the leg 4.

Accordingly, due to the provision of the first snap fit engagement means 40, 42 and the second snap fit engagement means 52, 54 the desiccant container can be easily snap fit over both legs of the accumulator tubing 2 and will be mounted towards the top of the tubing out of the sump or reservoir area located near the aspirator aperture.

Another aspect of the invention is shown in conjunction with FIGS. 5, 5a and 6 wherein a composite unitary accumulator tube/desiccant container structure is provided. This is of distinct advantage since the entire unit can be produced in one co-molding step with the desiccant container permanently affixed to the associated tubing. The end user can then procure this assembly, and in a highly automated process fill the container with desiccant, seal the fluid ingress and egress ports with appropriate screening, gauze, or felt material and then insert the entire unit into the desired accumulator housing, connecting it to the mating tubing of the air conditioning or refrigeration system, for example, the suction side line of the condenser.

FIG. 5 shows a pair of mold halves 100, 102 provided for use in conventional injection molding or gas assisted injection molding processes. Here, mold channel 104 is formed in the mold halves 100 and 102, and corresponds to (i.e., upon molding will form the) tube assembly 2 shown in FIG. 1. Conversely, old channel 106, is provided in the mold halves 100, 102 and will, upon molding, form the desiccant container portion 20 of the assembly.

Sprue 108 and associated runner are adapted to feed the channels 104 when the molds 100, 102 are in mating engagement. Similarly, sprue 112 and associated runner will feed the channels 106 when the mold halves are in mating relationship.

Gas assist injection molding technology may be utilized to help form this co-molded part. In this regard, the skilled artisan is directed toward the disclosure of U.S. Pat. No. 4,101,617 (Frederich), the disclosure of which is herein incorporated by reference. The patent explains and sets forth desired mold configurations and conditions for gas assisted injection molding.

In accordance with conventional injection molding technology, a molten resin, preferably a polyolefinic thermoplastic resin such as polyethylene, polypropylene and polybutene is injected into the respective cavities under pressures of about 10,000–30,000 psi. After the mold is completely full of injected plastic, the plastic is allowed to solidify and the resultant composite article is ejected via ejector pins or the like (not shown). Light machining may be needed to provide the desired finalized smooth contour to the part.

FIG. 5a discloses an orthogonal view of the integral accumulator tube/desiccant container assembly 200. Here, it can be seen that the tube section 202 is similar to the tube 2 shown in FIG. I with upstanding leg portions connected by the lower, curved bight section. Additionally a mouth 210 is provided at the top of tube section 204. This mouth, similar to mouth 4 shown in FIG. 1 is adapted to serve as an inlet port for refrigerant vapor, with the exit 212 adapted for fluid communication with the suction side tubing of a compressor (not shown) or other conduit.

The container section 220 of the integral assembly 200 comprises a slot 232 extending longitudinally through the cylindrical housing defined by the cylindrical peripheral walls 222. Leg 204 is joined to the slot along co-molded boundaries 271a, b with the cylindrical portion of the slot permanently affixed to tube 206 at co-molded boundary 273 formed in a substantially semi-circular contour.

Turning to FIG. 6 there is shown a transverse cross-section of a mold adapted for blow molding of the assembly shown in FIG. 5a. One half of the mold is shown here, with a symmetrical second mold half removed. Here, the mold 600 is provided with a mold channel 600 formed therein which is configured to provide the shaping for the tube section 202 of the combined assembly. An extruded parison 602 is provided within the mold channel 610 in accordance with conventional blow molding techniques.

Mold channel 614 is also provided in mold 600 and is configured to correspond to and form, upon molding, the container section 220 of the unitary structure. A parison 612 is provided in this mold channel 614. Air nozzle 625 is in communication with parison 602 with air nozzle 628 and associated air conduit 630 communicating with the parison 612. In accordance with conventional blow molding techniques, the molten parisons are inserted into the mold cavity, and compressed fluid such as compressed air or steam is admitted into the parisons so that the parisons will expand and form the shape corresponding to the mold channel 610, 612.

It is, of course, highly desirable to form the composite structure from a thermoplastic material such as the polyolefinic materials. Most preferably the composite material is prepared via co-molding of polyethylene, polypropylene, and polybutene, etc.

It is therefore apparent that the present invention provides plural means for friction or snap fitting to plural tubes or plural tube segments in an accumulator or the like. Initially, the ridges 40, 42 together, carried by the respective side walls of the slot 32, provide a means for firmly grasping a first tube or tube section. The protuberances 52, 54 carried by opposed walls of the slot provide a second friction fit grasping means to grasp a different segment of the accumulator tube or a second tube. Moreover, lateral stability of the container is provided by the ridge members 56, 58 which are also carried on opposed upstanding solid wall members bordering the elongated slot 32 formed in the container.

Various changes or modifications in the invention described may occur to those skilled in the art without departing from the true spirit or scope of the invention. The above description of preferred embodiments of the invention is intended to be illustrative and not limiting, and it is not intended that the invention be restricted thereto but that it be limited only by the true spirit and scope of the appended claims.

What is claimed is:

1. A desiccant container comprising a housing defining a desiccant containing chamber, at least two fluid pervious sections in said housing each defining fluid ingress and egress ports respectively, said container further comprising an elongated slot extending longitudinally through said housing, said slot including two opposed upstanding longitudinally extending walls, each of said walls comprising a longitudinally extending first ridge member, said first ridge members defining therebetween a first transverse dimension adapted to engage a first tubular member.

2. Desiccant container as recited in claim 1 wherein said slot has a generally cylindrical portion having a diameter dimension and wherein said first transverse dimension is smaller than said diameter dimension.

3. Desiccant container as recited in claim 2 wherein said first ridge members are disposed in parallel relation to each other.

4. A desiccant container comprising a housing defining a desiccant containing chamber, at least two fluid pervious sections in said housing each defining fluid ingress and egress ports respectively, said container further comprising an elongated slot extending longitudinally through said housing, said slot including two opposed upstanding longitudinally extending walls, each of said walls comprising a longitudinally extending first ridge member, said first ridge members defining therebetween a first transverse dimension adapted to engage a first tubular member, said slot having a generally cylindrical portion having a diameter dimension, said first transverse dimension being smaller than said diameter dimension, said first ridge members being disposed in parallel relation to each other, said housing being generally cylindrical and wherein said first ridge members are disposed at an acute angle relative to a longitudinal axis of said cylindrical housing.

5. Desiccant container as recited in claim 4 wherein said acute angle is about 10°–about 20°.

6. Desiccant container as recited in claim 5 wherein said acute angle is about 14°.

7. A desiccant container comprising a housing defining a desiccant containing chamber, at least two fluid pervious sections in said housing each defining fluid ingress and egress ports respectively, said container further comprising an elongated slot extending longitudinally through said housing, said slot including two opposed upstanding longitudinally extending walls, each of said walls comprising a longitudinally extending first ridge member, said first ridge members defining therebetween a first transverse dimension adapted to engage a first tubular member said slot having a generally cylindrical portion having a diameter dimension and wherein said first transverse dimension is smaller than said diameter dimension, wherein the ratio of said first transverse dimension to said diameter dimension is about 0.80–0.99:1.

8. Desiccant container as recited in claim 7 wherein said ratio is about 0.90:1.

9. A desiccant container comprising a housing defining a desiccant containing chamber, at least two fluid pervious sections in said housing each defining fluid ingress and egress ports respectively, said container further comprising an elongated slot extending longitudinally through said housing, said slot including two opposed upstanding longitudinally extending walls, each of said walls comprising a longitudinally extending first ridge member, said first ridge members defining therebetween a first transverse dimension adapted to engage a first tubular member wherein said slot, when viewed in plan, has an elongated substantially U-shaped cross-section, said slot further comprising a generally cylindrical portion, said upstanding longitudinally extending walls being connected to said cylindrical portion of said slot at proximal ends of said walls with opposite distal ends of said walls located proximate a circumferential boundary of said housing, said distal ends of said walls each including a protuberant wall portion, said protuberant wall portions defining therebetween a second transverse dimension adapted to frictionally engage a second tubular member.

10. Desiccant container as recited in claim 9 wherein each first ridge member is located proximate one of said proximal ends of said walls, each of said walls further comprising a second ridge member extending longitudinally along said wall and spaced from said first ridge member along each wall, said second ridge members defining therebetween a third transverse dimension adapted to limit lateral movement of said housing relative to said first tubular member.

11. Desiccant container as recited in claim 1 wherein said fluid ingress port comprises a fluid pervious felt material extending over a top surface of said housing and wherein said fluid egress port comprises a fluid pervious felt material extending over a bottom surface of said housing.

12. A desiccant container comprising a housing defining a desiccant container chamber, fluid flow entry and exit means for permitting fluid to contact said desiccant and egress from said housing, an elongated slot extending through said housing and bounded by two opposed wall members, a first grasping means attached to one of said walls for grasping a first tubular section, and a second grasping means attached to one of said walls for grasping a second tubular section.

13. Desiccant container comprising a housing defining a desiccant containing chamber, at least two fluid pervious sections in said housing each defining fluid ingress and egress ports respectively, said container further comprising an elongated slot extending longitudinally through said housing, said slot including two opposed upstanding longitudinally extending walls, said slot, when viewed in plan, having an elongated substantially U-shaped cross-section, said slot further comprising a generally cylindrical portion, said upstanding longitudinally extending walls being connected to said cylindrical portion of said slot at proximal ends of said walls with opposite distal ends of said walls located proximate a circumferential boundary of said housing, said distal ends of said walls each including a protuberant wall portion, said protuberant wall portions adapted to frictionally engage a tubular member.

* * * * *